(12) United States Patent
Yu

(10) Patent No.: US 10,040,133 B2
(45) Date of Patent: Aug. 7, 2018

(54) AXLE DEVICE AND BORING TOOL

(71) Applicant: Sin-Yi Yu, Changhua County (TW)

(72) Inventor: Sin-Yi Yu, Changhua County (TW)

(*) Notice: Subject to any disclaimer, the term of this patent is extended or adjusted under 35 U.S.C. 154(b) by 0 days.

(21) Appl. No.: 15/628,661

(22) Filed: Jun. 21, 2017

(65) Prior Publication Data

US 2018/0169772 A1    Jun. 21, 2018

(30) Foreign Application Priority Data

Dec. 21, 2016   (TW) .............................. 105219431 U

(51) Int. Cl.
*B23B 51/04* (2006.01)

(52) U.S. Cl.
CPC ...... *B23B 51/0466* (2013.01); *B23B 51/0473* (2013.01)

(58) Field of Classification Search
CPC ................................................. B23B 51/0473
See application file for complete search history.

(56) References Cited

U.S. PATENT DOCUMENTS

| | | | | |
|---|---|---|---|---|
| 2,482,439 A * | 9/1949 | Smith | ................. | B23B 51/0426 144/23 |
| 2,654,611 A | 10/1953 | Lee | | |
| 5,073,877 A | 12/1991 | Jeter | | |
| 5,226,762 A * | 7/1993 | Ecker | ................. | B23B 51/0473 408/204 |
| 6,341,925 B1 * | 1/2002 | Despres | ............. | B23B 51/0453 408/204 |
| 6,641,338 B2 * | 11/2003 | Despres | ............. | B23B 51/0453 408/204 |
| 6,705,807 B1 * | 3/2004 | Rudolph | ............. | B23B 51/0426 279/143 |
| 7,160,064 B2 | 1/2007 | Jasso | | |
| 7,850,405 B2 * | 12/2010 | Keightley | .......... | B23B 51/0473 279/8 |
| 9,687,917 B2 * | 6/2017 | Pamatmat | .......... | B23B 51/0473 |
| 2007/0110527 A1 | 5/2007 | Jasso | | |
| 2007/0160434 A1 * | 7/2007 | Gillissen | ............ | B23B 51/0426 408/68 |
| 2017/0291228 A1 * | 10/2017 | Pamatmat | .......... | B23B 51/0473 |

FOREIGN PATENT DOCUMENTS

| TW | M444262 U | 1/2013 |
|---|---|---|
| TW | 454917 U | 6/2013 |

* cited by examiner

*Primary Examiner* — Daniel Howell
(74) *Attorney, Agent, or Firm* — CKC & Partners Co., Ltd.

(57) ABSTRACT

The present disclosure provides an axle device and a boring tool. The axle device includes a main shaft, an expanding unit, a drill, and an engaging unit. The main shaft is magnetic. The expanding unit includes a cone blocking member and an expanding member. The cone blocking member has an inclined plane. The expanding member is limited at the main shaft and includes a plurality of pawls, wherein the pawls are against the inclined plane. The engaging unit includes a rotating member and an engaging element. The rotating member is screwed on the main shaft. The engaging element engages the drill with the rotating member. When the rotating member rotates and moves toward a first direction, the engaging element correspondingly brings the drill and the cone blocking member toward the first direction, such that the inclined plane of the cone blocking member expands the pawls outwardly.

18 Claims, 17 Drawing Sheets

AXLE DEVICE AND BORING TOOL

RELATED APPLICATIONS

This application claims priority to Taiwan Application Serial Number 105219431, filed Dec. 21, 2016, which is herein incorporated by reference.

BACKGROUND

Technical Field

The present disclosure relates to an axle device. More particularly, the present disclosure relates to an axle device for use with a boring tool.

Description of Related Art

Conventionally, when an axle device is combined with a hole saw to form a boring tool, the procedure of assembling the axle device with the hole saw is tedious and inconvenient. See FIG. 1A and FIG. 1B, wherein FIG. 1A is a perspective view of a conventional boring tool 10 and FIG. 1B is an exploded view of the conventional boring tool 10. The conventional boring tool 10 includes a hole saw 11, a main shaft 13, and a drill 15 disposed at the front end of the main shaft 13. The hole saw 11 includes a peripheral wall 111 and an end surface 113 surrounded by and connected to the peripheral wall 111. Teeth 115 are circumferentially disposed at the other end of the peripheral wall 111 and spaced apart to perform a boring process on a workpiece. A central opening 110 is penetratingly disposed on the end surface 113 of the hole saw 11 and penetrable by the drill 15 and the main shaft 13, thereby causing the end surface 113 of the hole saw 11 to abut against a fixing portion 131 of the main shaft 13. An internal thread segment 117 is disposed from the inner edge of a peripheral wall on one end surface of the central opening 110 of the hole saw 11 to mesh with an external thread segment 133 disposed at the front end of the main shaft 13. Preferably, two protruding posts 135 disposed at the fixing portion 131 of the main shaft 13 are confined and fixed to any two limiting holes 119 of the hole saw 11. The other end of the main shaft 13 of the boring tool 10 is a connection end selectively mounted on a driving unit, driving device, or driving end of an external electrically-driven or pneumatically-driven tool. The hole saw 11 and the drill 15 are driven to rotate in the same direction by a torque generated by an external power.

See FIG. 2A and FIG. 2B, wherein FIG. 2A is a perspective view of a conventional boring tool 20 and FIG. 2B is an exploded view of the conventional boring tool 20. The conventional boring tool 20 includes a hole saw 21, a main shaft 23, and a drill 25 disposed at the front end of the main shaft 23. The hole saw 21 includes a peripheral wall 211 and an end surface 213 surrounded by and connected to the peripheral wall 211. Teeth 215 are circumferentially disposed at the other end of the peripheral wall 211 and spaced apart to perform a boring process on a workpiece. A central opening 210 is penetratingly disposed on the end surface 213 of the hole saw 21 and penetrable by the drill 25 and the main shaft 23, thereby causing the end surface 213 of the hole saw 21 to abut against a fixing portion 231 of the main shaft 23. An internal thread segment 217 is disposed from the inner edge of a peripheral wall on one end surface of the central opening 210 of the hole saw 21 to mesh with an external thread segment 233 disposed at the front end of the main shaft 23. The other end of the main shaft 23 of the boring tool 20 is a connection end selectively mounted on a driving unit, driving device, or driving end of an external electrically-driven or pneumatically-driven tool. The hole saw 21 and the drill 25 are driven to rotate in the same direction by a torque generated by an external power.

However, the conventional boring tools 10 and 20 have a drawback described below. Taking the conventional boring tool 10 as an example, if the internal thread segment 117 of the hole saw 11 or the external thread segment 133 of the main shaft 13 is stripped or broken, the hole saw 11 and the main shaft 13 cannot be disengaged from each other to unlock them or change the hole saw 11 or the drill 15, and so as the conventional boring tool 20. Even if the hole saw 11 and the main shaft 13 are separated by force, it will be impossible for a new hole saw to be firmly connected to the main shaft 13. Since the separation of the hole saw and the main shaft takes much time, not only are an assembly operation and process delayed, but the boring tool and its related components must also be repurchased to the detriment of management and procurement cost control. Therefore, there is a need to speed up the assembly or disassembly process of the boring tool and render it easy to assemble or operate the boring tool.

SUMMARY

The present disclosure provides an axle device performing a perforating operation with a hole saw. The axle device includes a main shaft, an expanding unit, a drill, and an engaging unit. The main shaft includes a fixing portion, a driving portion, and an external thread segment. The fixing portion has a first central through hole and at least one protruding post, wherein the protruding post protrudes from an end surface of the fixing portion, and the fixing portion is magnetic. The driving portion connects with a driving device for linking up with the fixing portion. The external thread segment is connected between the fixing portion and the driving portion and has a central chamber and a first through hole, wherein an opening of the central chamber faces the first central through hole, the opening is smaller than the first central through hole, the first through hole is disposed at a side of the external thread segment, and an axial direction of the first through hole is perpendicular to an axial direction of the central chamber. The expanding unit includes a cone blocking member and an expanding member. The cone blocking member has a second central through hole and an inclined plane. The expanding member is limited at a limiting slot formed by the first central through hole and the opening and includes a second through hole and a plurality of pawls, wherein the second through hole corresponds to the second central through hole, the pawls surround the second through hole and against the inclined plane of the cone blocking member. The drill is engaged in the second central through hole, and a tail portion of the drill inserts the central chamber via the second central through hole, the second through hole, and the first central through hole in order. The engaging unit includes a rotating member and an engaging element. The rotating member is screwed on the external thread segment. The engaging element penetrates the first through hole, moves along with the rotating member, and engages the tail portion of the drill with the rotating member. When the rotating member rotates and moves toward a first direction, the engaging element correspondingly brings the drill and the cone blocking member toward the first direction, such that the inclined plane of the cone blocking member expands the pawls outwardly.

The present disclosure provides a boring tool that includes the aforementioned axle device and a hole saw. The hole saw is assembled with the axle device, wherein an outer diameter of the hole saw is larger than a diameter of the fixing portion. When the axle device is assembled with the hole saw, the protruding post is limited in at least one limiting hole at an end surface of the hole saw. The expanding unit is sleeved in a central opening of the end surface of the hole saw. The axle device magnetically attracts the end surface of the hole saw with the fixing portion, such that the end surface of the hole saw directly contacts with the end surface of the fixing portion.

The present disclosure provides a boring tool that includes the aforementioned axle device and a hole saw, wherein the aforementioned axle device further includes a transition unit. The transition unit is connected between the axle device and the hole saw whose diameter is smaller than an outer diameter of the fixing portion, wherein the transition unit is screwed to the hole saw, limits the protruding post on the fixing portion, and sleeves the expanding unit of the axle device.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
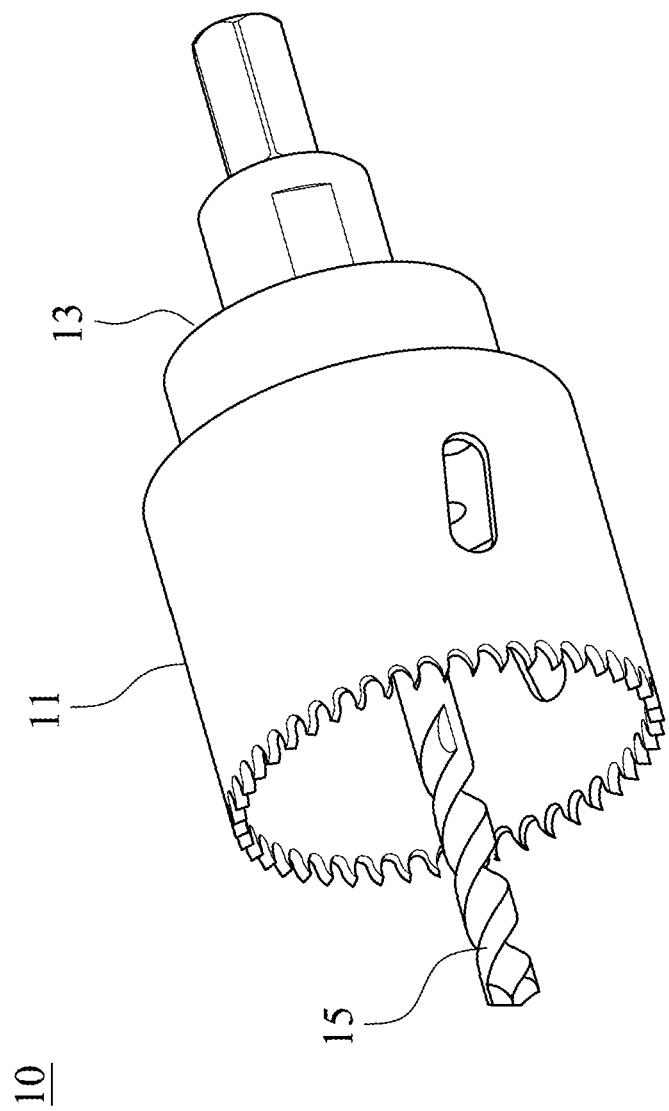
FIG. 1A is a perspective view of a conventional boring tool.
Figure 1B:
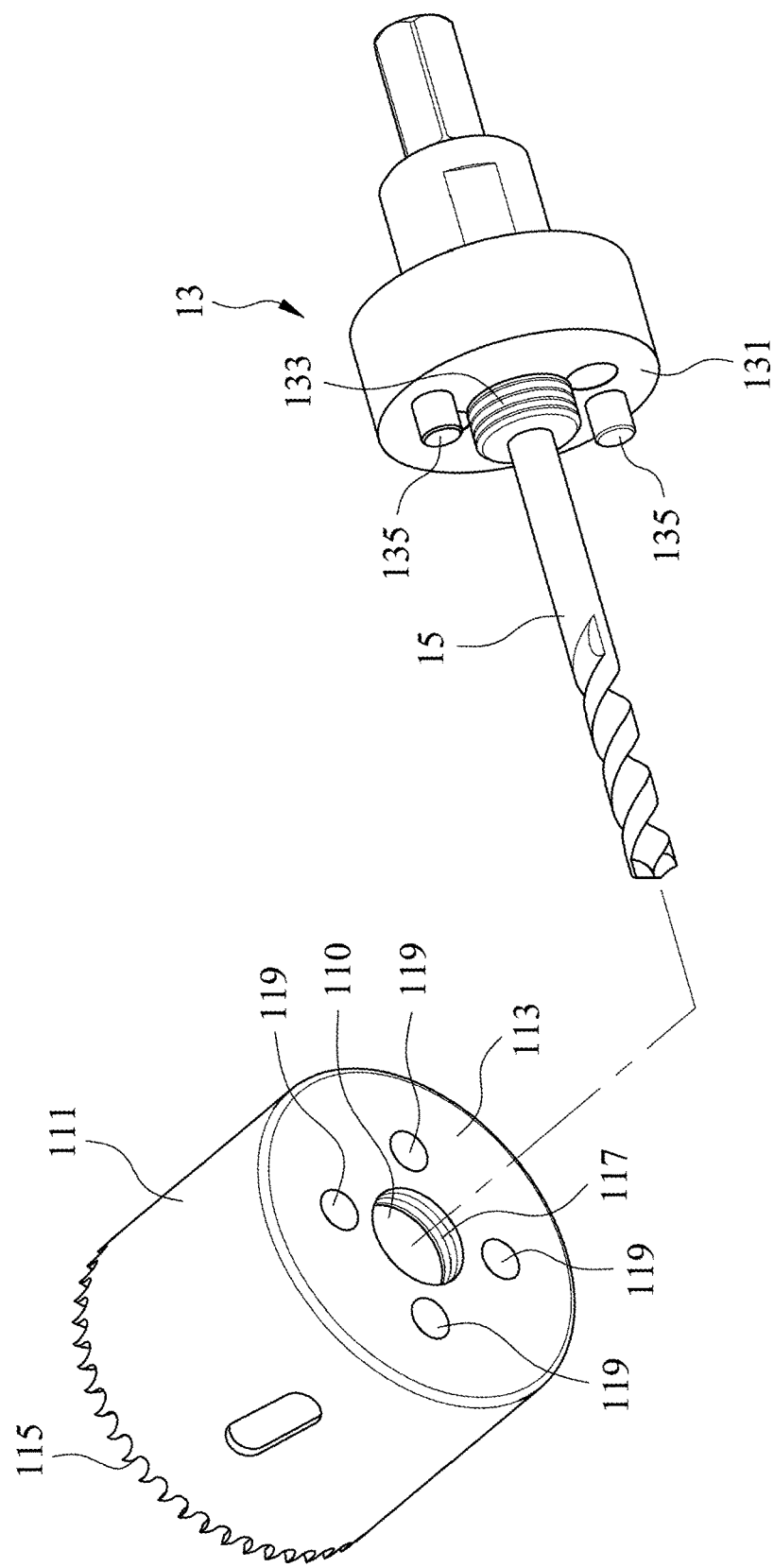
FIG. 1B is an exploded view of the conventional boring tool.
Figure 2A:
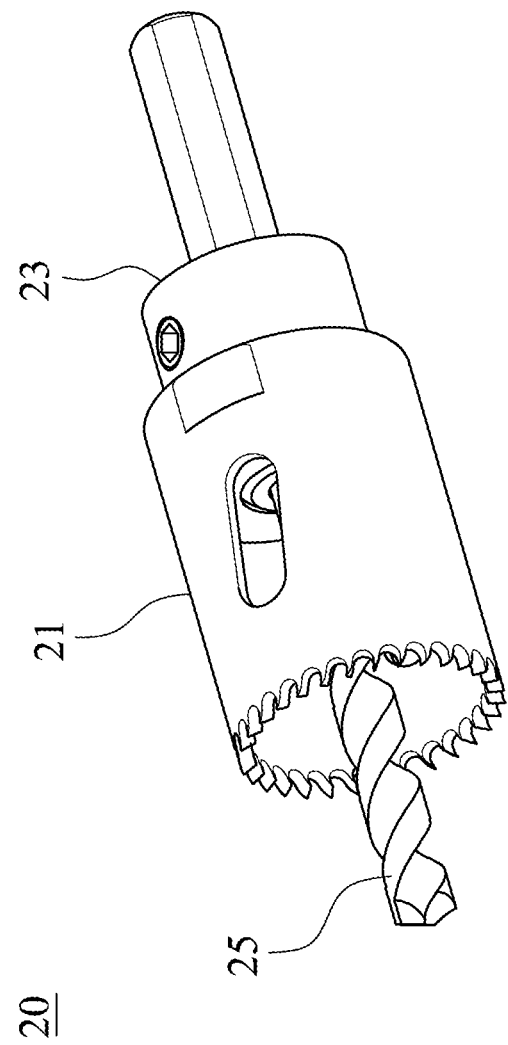
FIG. 2A is a perspective view of a conventional boring tool.
Figure 2B:
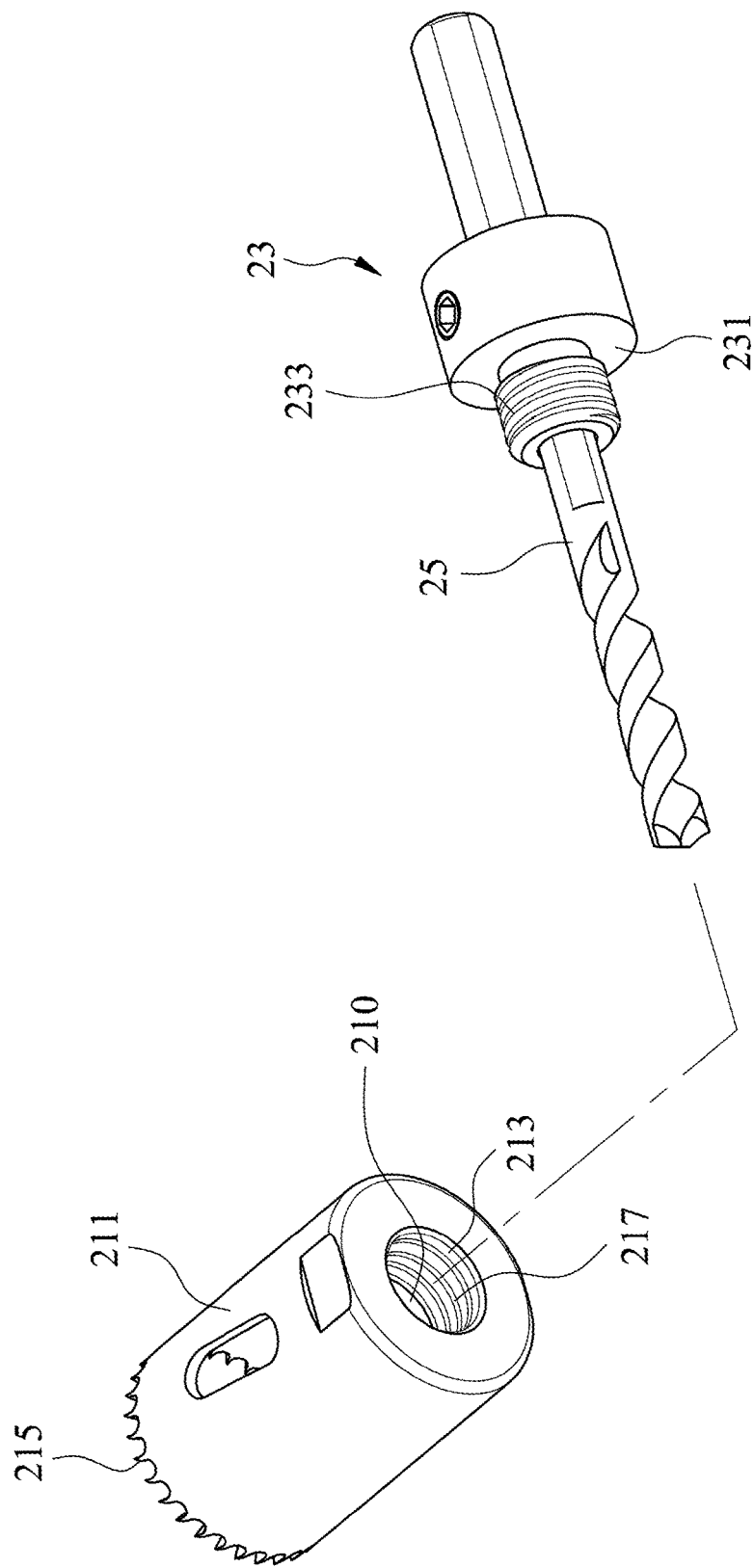
FIG. 2B is an exploded view of the conventional boring tool.
Figure 3:
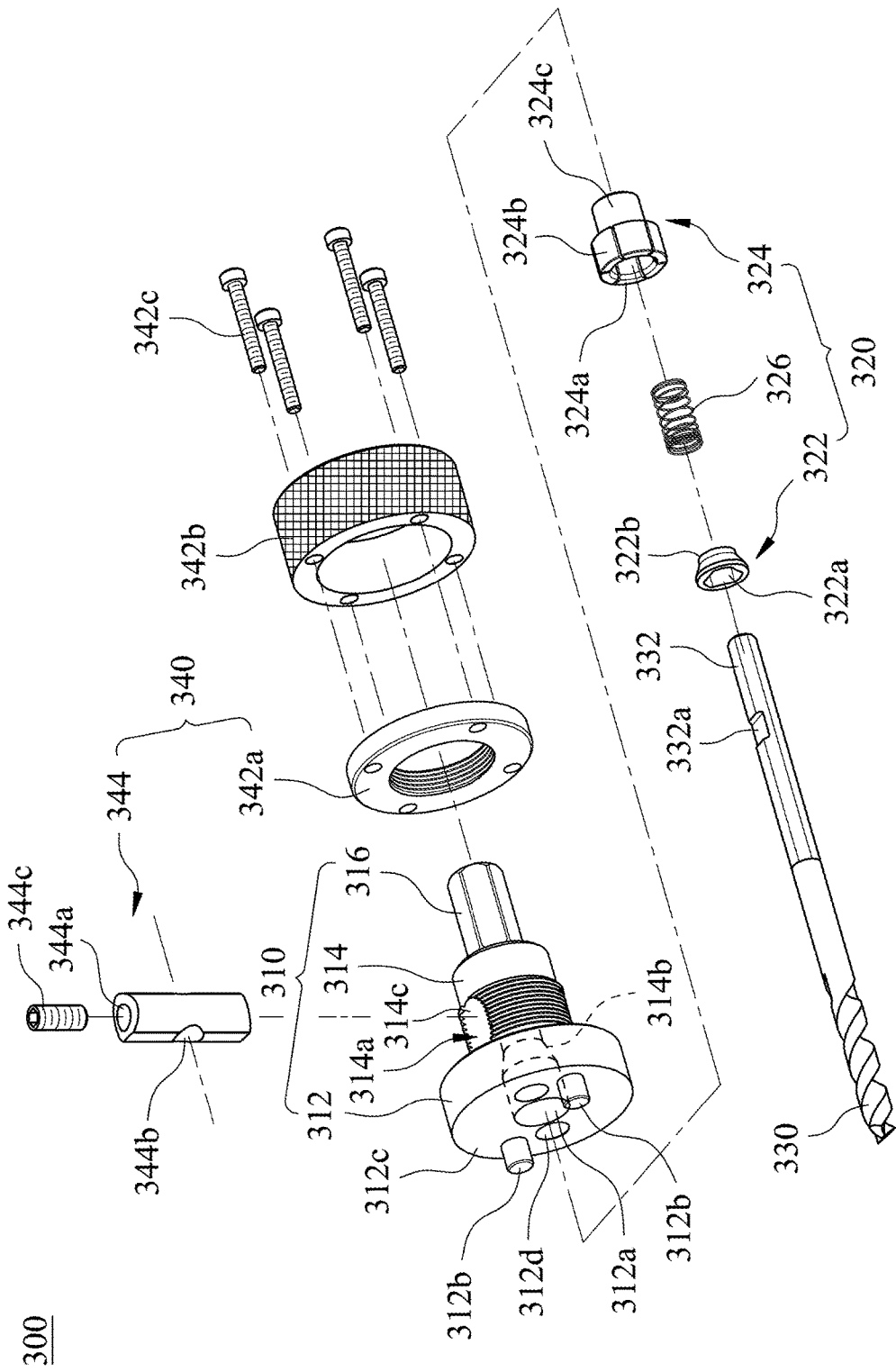
FIG. 3 is an exploded view of an axle device according to an exemplary embodiment of the present disclosure.

FIG. 3 is an exploded view of an axle device 300 according to an exemplary embodiment of the present disclosure. In the present embodiment, the axle device 300 includes a main shaft 310, an expanding unit 320, a drill 330, and an engaging unit 340. The main shaft 310 includes a fixing portion 312, a driving portion 316, and an external thread segment 314.

The fixing portion 312 has a first central through hole 312a and protruding posts 312b, wherein the protruding posts 312b protrude from an end surface 312c of the fixing portion 312, and the fixing portion 312 is magnetic. In the present embodiment, the magnetic force of the fixing portion 312 may be provided by magnetic blocks 312d disposed at the end surface 312c of the fixing portion 312, but the present disclosure is not limited thereto. The driving portion 316 connects with a driving device for linking up with the fixing portion 312.

The external thread segment 314 is connected between the fixing portion 312 and the driving portion 316 and has a central chamber 314a and a first through hole 314c. An opening 314b of the central chamber 314a faces the first central through hole 312a. The opening 314b is smaller than the first central through hole 312a. The first through hole 314c is disposed at a side of the external thread segment 314. An axial direction of the first through hole 314c is perpendicular to an axial direction of the central chamber 314a.

The expanding unit 320 includes a cone blocking member 322 and an expanding member 324. The cone blocking member 322 has a second central through hole 322a and an inclined plane 322b. The expanding member 324 is limited at a limiting slot formed by the first central through hole 312a and the opening 314b and includes a second through hole 324a and a plurality of pawls 324b, wherein the second through hole 324a corresponds to the second central through hole 322a, the pawls 324b surround the second through hole 324a and against the inclined plane 322b of the cone blocking member 322. In the present embodiment, the pawls 324b may be connected with an insertion 324c of the expanding member 324, and the insertion 324c may fit in the limiting slot formed by the first central through hole 312a and the opening 314b, such that the pawls 324b may be against the end surface 312c. In some embodiments, the number of the pawls 324b may be six or eight, but the present disclosure is not limited thereto.

The drill 330 is engaged in the second central through hole 322a, and a tail portion 332 of the drill 330 inserts the central chamber 314a via the second central through hole 322a, the second through hole 324a, and the first central through hole 312a in order. In one embodiment, the expanding unit 320 may further include an elastic member 326, wherein the elastic member 326 is disposed in the second through hole 324a and surrounded by the pawls 324b and against the inclined plane 322b of the cone blocking member 322. The tail portion 332 of the drill 330 may insert the central chamber 314a via the second central through hole 322a, the elastic member 326, the second through hole 324a, and the first central through hole 312a in order.

The engaging unit 340 includes a rotating member 342a and an engaging element 344. The rotating member 342a is screwed on the external thread segment 314 and contacts with the fixing portion 312. The engaging element 344 may penetrate the first through hole 314c after the rotating member 342a contacts with the fixing portion 312. The engaging element 344 moves along with the rotating member 342a, and engages the tail portion 332 of the drill 330 with the rotating member 342a.

In the present embodiment, the engaging element 344 may be a short rod having a third through hole 344a, a fourth through hole 344b, and a fixing element 344c. The third through hole 344a is disposed along with the axial direction of the engaging element 344 and has inner threads. The axial direction of the fourth through hole 344b is perpendicular to the axial direction of the third through hole 344a. The fixing element 344c may have outer threads and may be screwed into the third through hole 344a and engages a limiting recess 332a on the tail portion 332 of the drill 330, such that the drill 330 will be maintained in position after penetrating the central chamber 314a and the fourth through hole 344b instead of being ejected out by the elastic member 326 which is compressed. The length of the engaging element 344 may be larger than the diameter of the external thread segment 314 but smaller than the diameter of the fixing portion 312.

In one embodiment, the rotating member 342a may be connected with a holding portion 342b via screws 342c, wherein an outer annular surface of the holding portion 342b may be disposed with anti-skid lines for facilitating the user to hold and rotate, such that the rotating member 342a can be rotated easier.

Figure 4A:
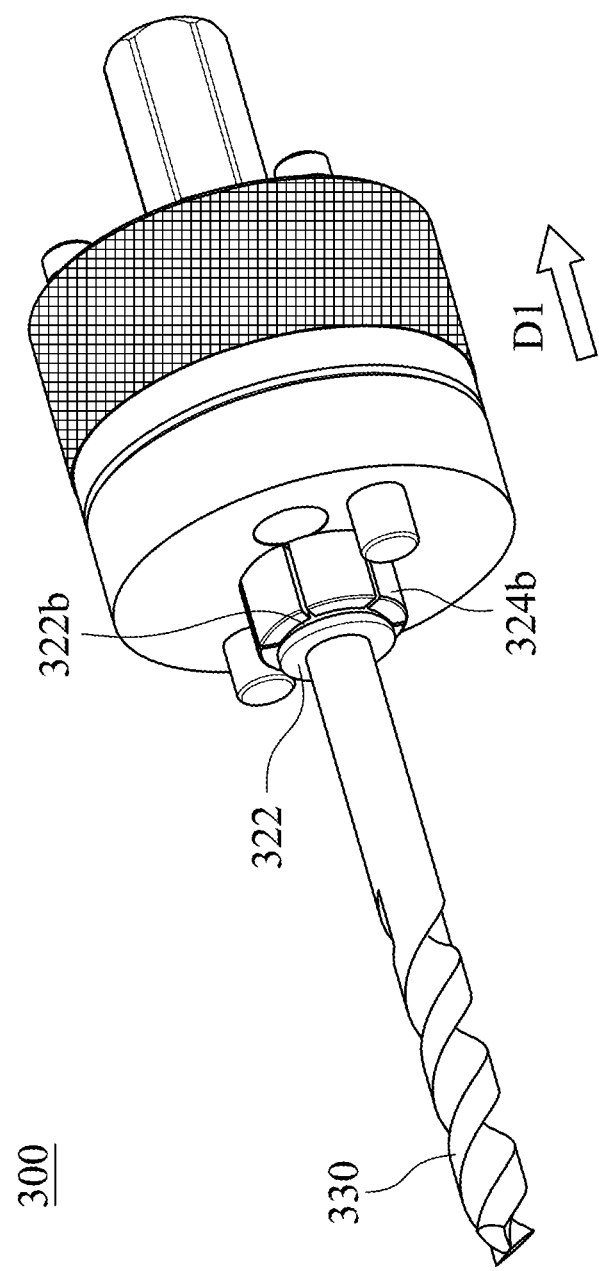
FIG. 4A is a 3-D view of the axle device according to FIG. 3.
Figure 4B:
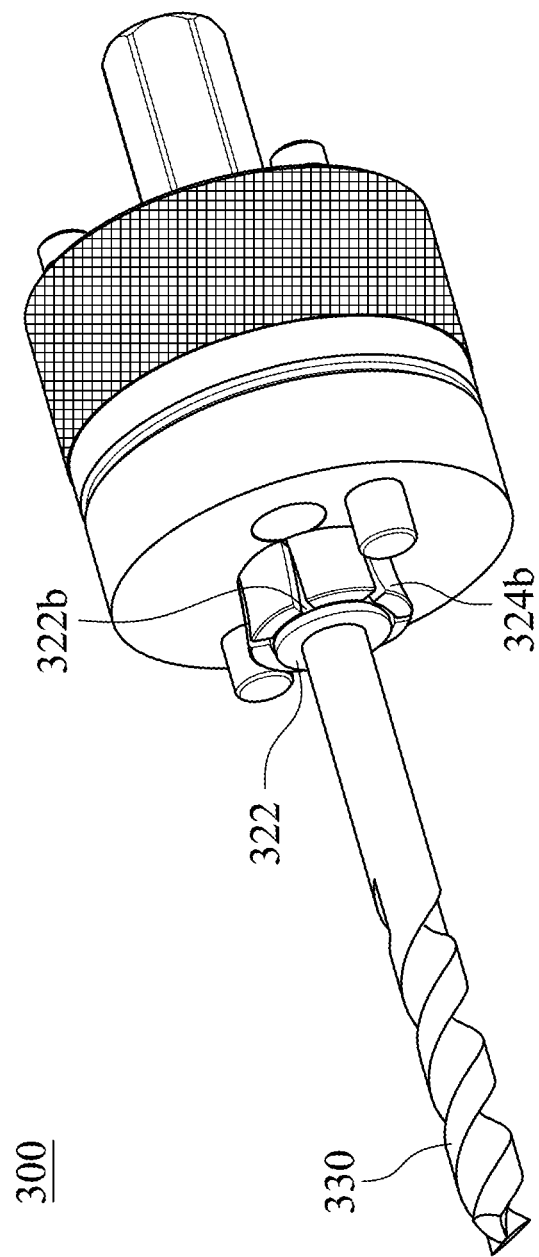
FIG. 4B is a 3-D view of the axle device whose rotating member has been rotated and moved toward a first direction according to an exemplary embodiment of the present disclosure.
Figure 5A:
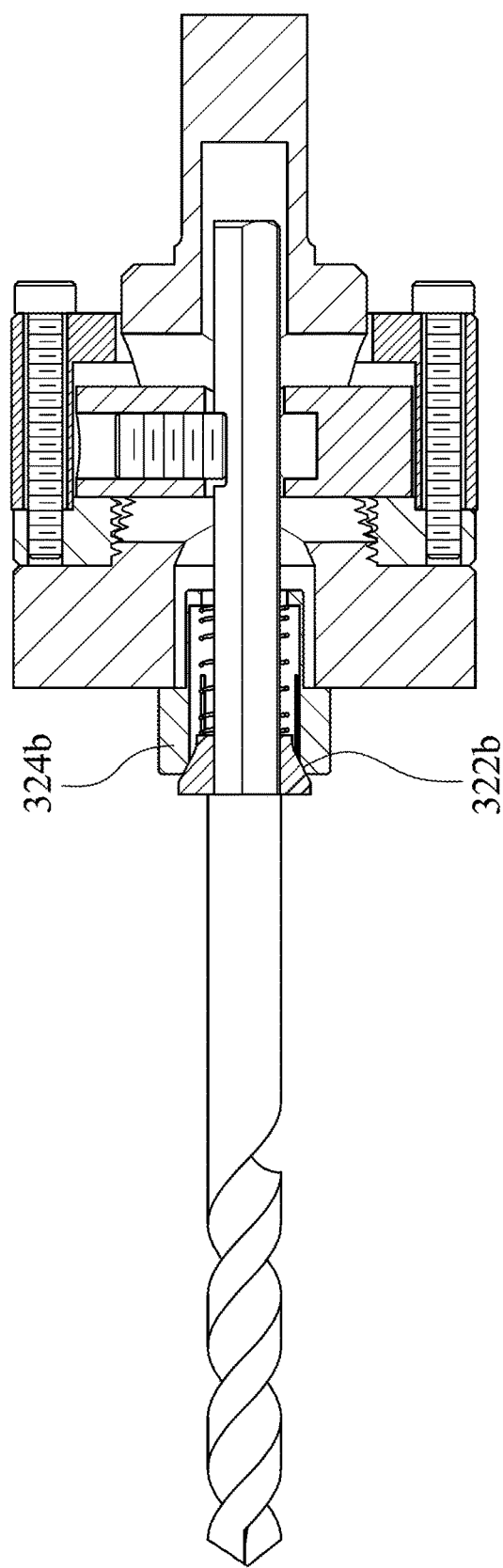
FIG. 5A is a cross-sectional view of FIG. 4A.
Figure 5B:
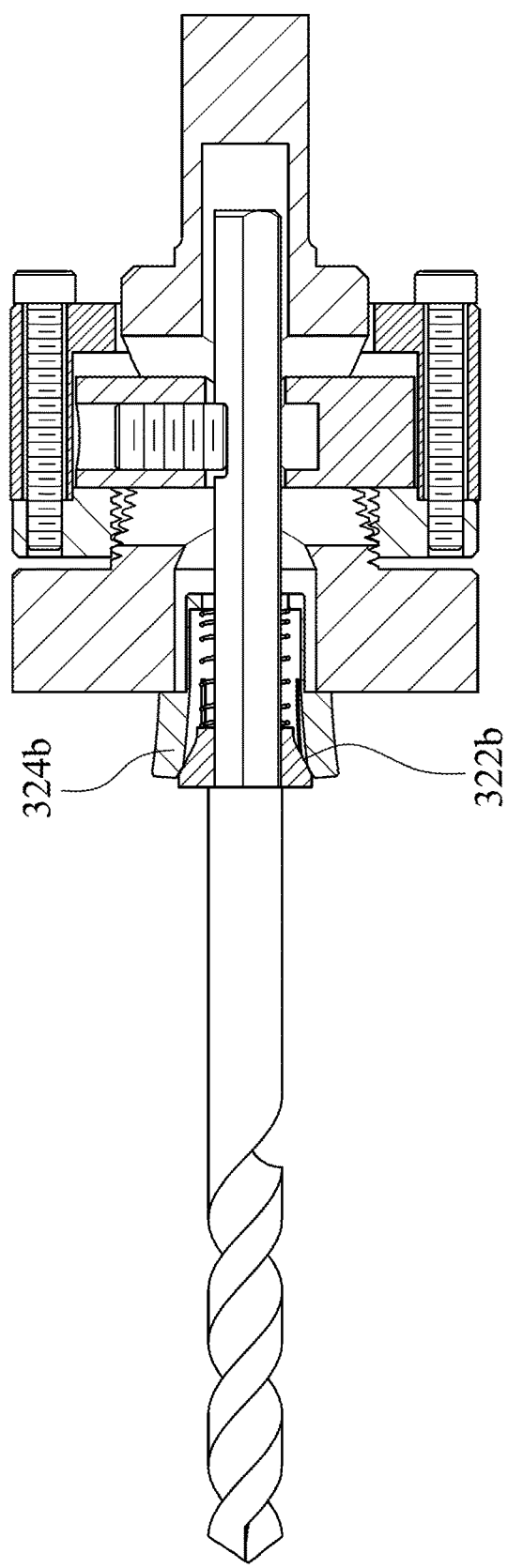
FIG. 5B is a cross-sectional view of FIG. 4B.

See FIG. 4A, FIG. 4B, FIG. 5A, and FIG. 5B, wherein FIG. 4A is a 3-D view of the axle device 300 according to FIG. 3, FIG. 4B is a 3-D view of the axle device 300 whose rotating member 342a has been rotated and moved toward a first direction D1 according to an exemplary embodiment of the present disclosure, FIG. 5A is a cross-sectional view of FIG. 4A, and FIG. 5B is a cross-sectional view of FIG. 4B.

As shown in FIG. 4A and FIG. 5A, the pawls 324b are against the inclined plane 322b of the cone blocking member 322. In this case, when the rotating member 342a rotates and moves toward the first direction D1, the engaging element 344 correspondingly brings the drill 330 and the cone blocking member 322 toward the first direction D1, such that the inclined plane 322b of the cone blocking member 322 expands the pawls 324b outwardly, as shown in FIG. 4B and FIG. 5B. With this feature, the axle device 300 can be better assembled with a hole saw, and the detailed descriptions will be provided in the following paragraphs.

Figure 6A:
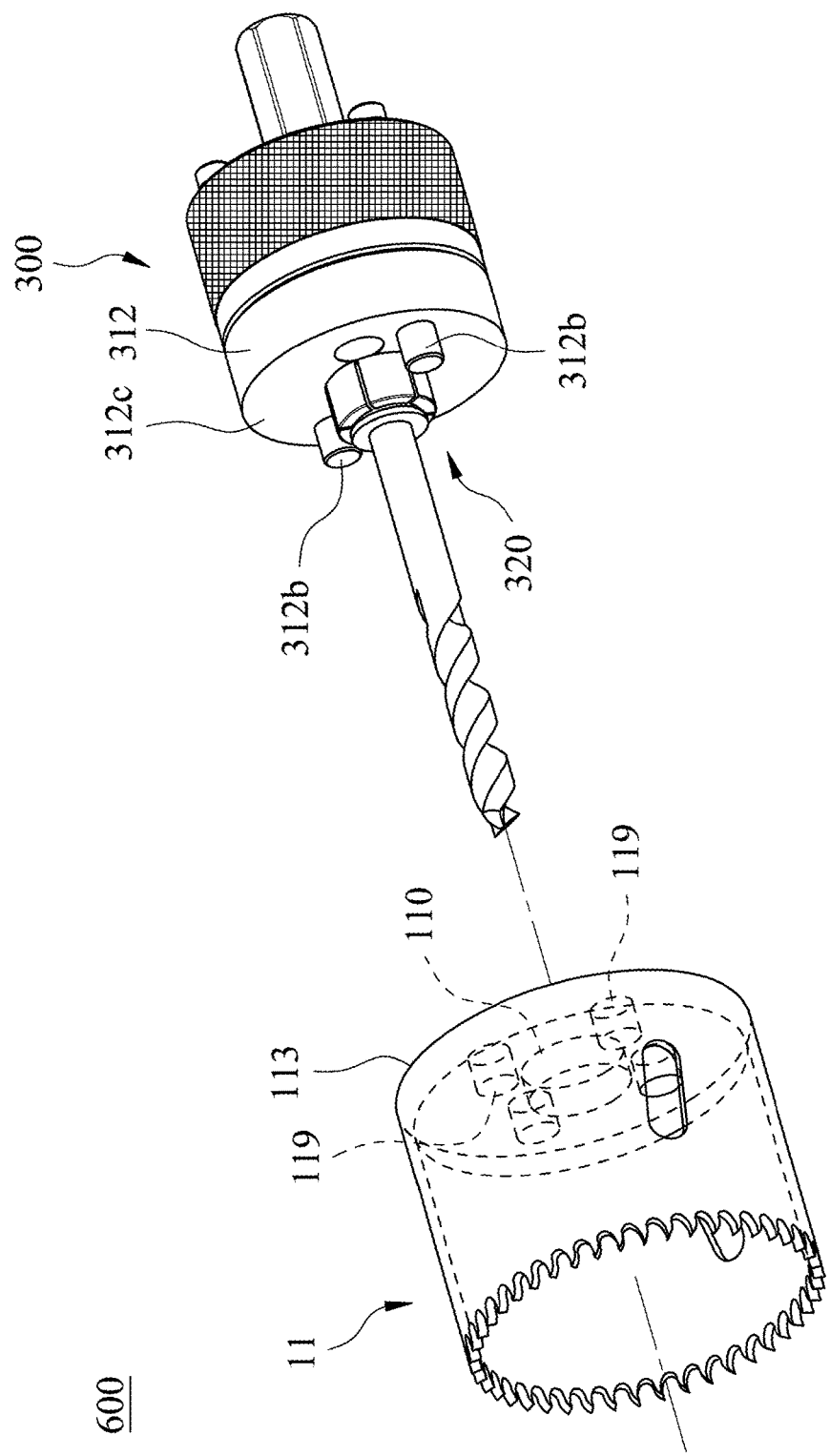
FIG. 6A is a schematic diagram of the process of assembling the axle device with a hole saw as a boring tool according to an exemplary embodiment of the present disclosure.
Figure 6B:
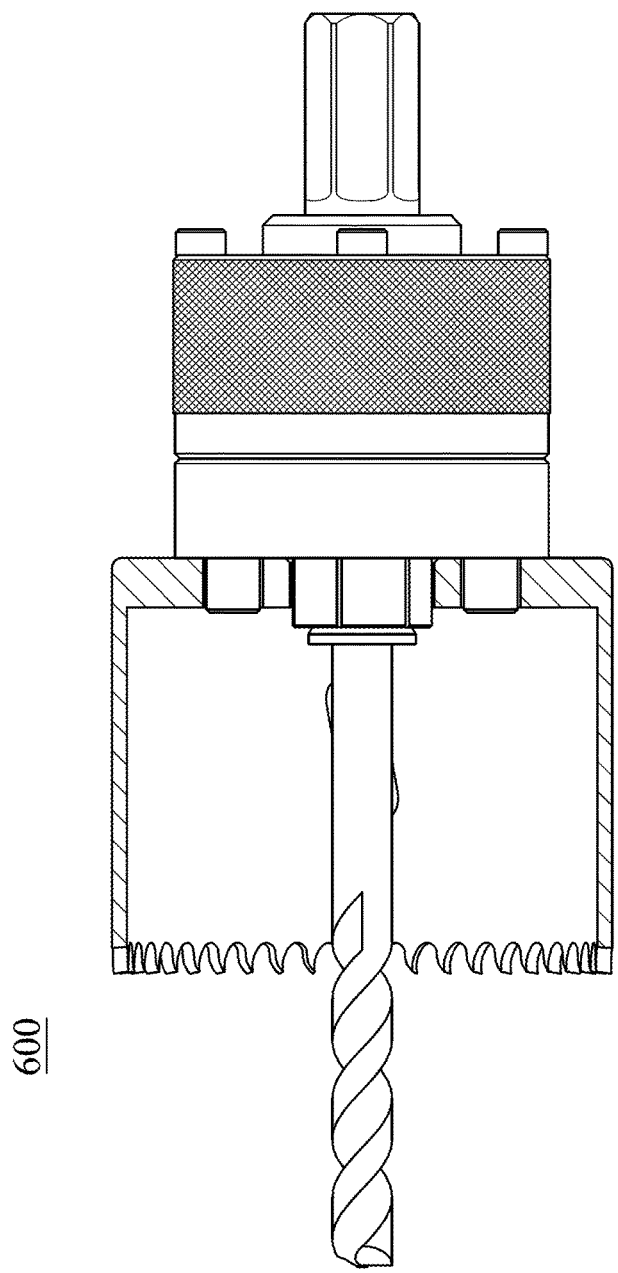
FIG. 6B is a cross-sectional view of the boring tool according to FIG. 6A.

See FIG. 6A and FIG. 6B, wherein FIG. 6A is a schematic diagram of the process of assembling the axle device 300 with a hole saw 11 as a boring tool 600 according to an exemplary embodiment of the present disclosure and FIG. 6B is a cross-sectional view of the boring tool 600 according to FIG. 6A.

In the present embodiment, the hole saw 11 may be a regular hole saw which has been introduced in the above. As shown in FIG. 6A, an outer diameter of the hole saw 11 is larger than a diameter of the fixing portion 312. When the axle device 300 is assembled with the hole saw 11, the protruding posts 312b are limited in the limiting holes 119 at the end surface 113 of the hole saw 11. The expanding unit 320 is sleeved in the central opening 110 of the end surface 113 of the hole saw 11. The axle device 300 magnetically attracts the end surface 113 of the hole saw 11 with the fixing portion 312, such that the end surface 113 of the hole saw 11 directly contacts with the end surface 312c of the fixing portion 312.

Since the expanding unit 320 is sleeved in the central opening 110, a tightness between the pawls 324b and the central opening 110 of the hole saw 11 correspondingly increases when the pawls 324b are expanded outwardly as illustrated in FIG. 6B.

From another perspective, since the hole saw 11 can be assembled with the axle device 300 via the magnetic force of the fixing portion 312 and sleeving the expanding unit 320, rather than via threads as the conventional way, the axle device 300 and the hole saw 11 can be easier to disengage from each other to unlock and change the hole saw 11. Accordingly, the process of assembling or disassembling will be more efficient, and the cost of maintenance can be reduced since the hole saw 11 and the axle device 300 will be less probable to be broken or stripped. Besides, the appearance of the hole saw 11 does not need to be modified to be used with the axle device 300, which improves the convenience of using.

In some embodiments, some sizes of hole saws may be too small to be disposed with limiting holes such as the limiting holes 119 on the hole saw 11, which makes them difficult to be assembled with the axle device 300 via the way the hole saw 11 is assembled with the axle device 300. For example, the hole saw whose diameter is smaller than an outer diameter of the fixing portion 312 of the axle device 300 may not have enough area to be configured with limiting holes to limit the protruding posts 312b of the axle device 300.

In response thereto, the axle device 300 may further include a transition unit which is used to be connected between the axle device 300 and the hole saw whose diameter is smaller than an outer diameter of the fixing portion 312. In one embodiment, the transition unit is screwed to the hole saw, limits the protruding posts 312b on the fixing portion 312, and sleeves the expanding unit 320 of the axle device 300.

Figure 7:
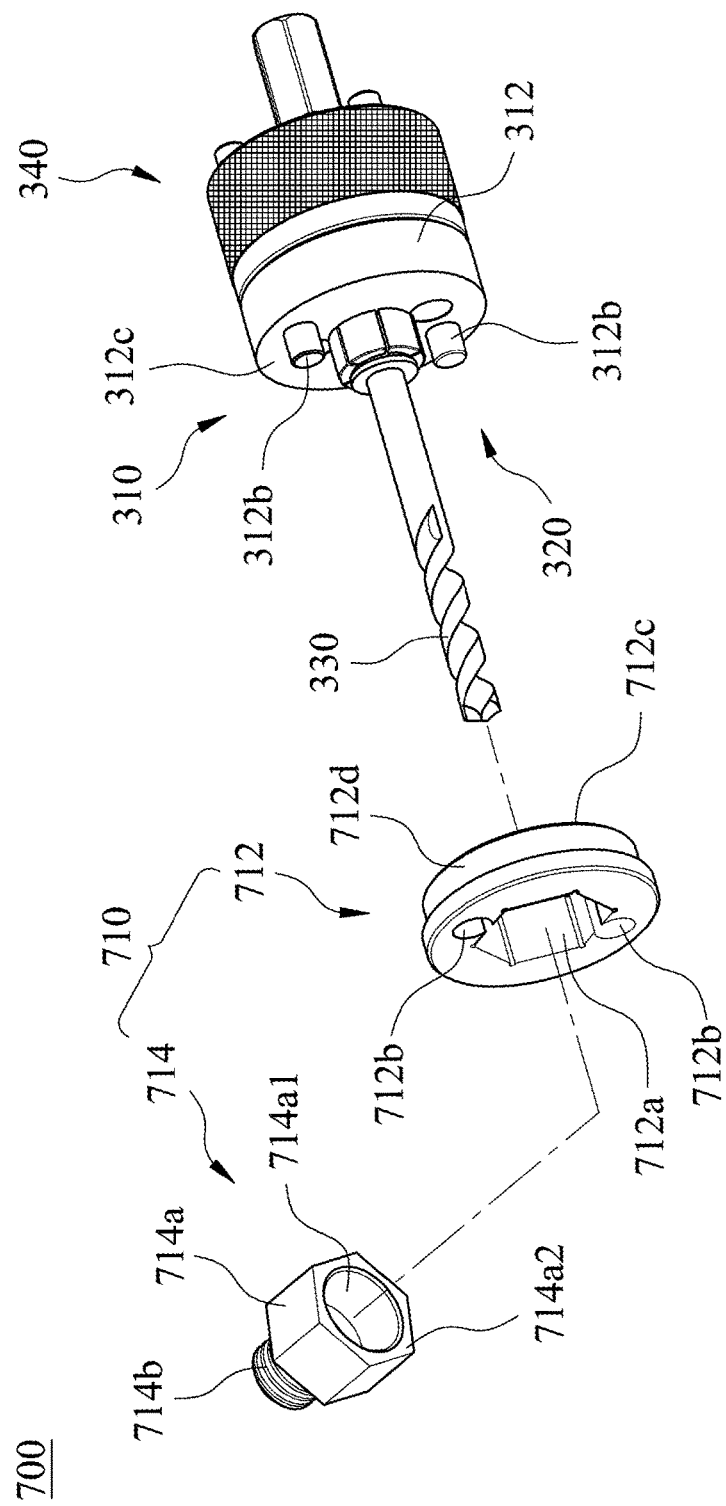
FIG. 7 is a schematic diagram of an axle device according to an exemplary embodiment of the present disclosure.

See FIG. 7, which is a schematic diagram of an axle device 700 according to an exemplary embodiment of the present disclosure. In the present embodiment, the axle device 700 includes the main shaft 310, the expanding unit 320, the drill 330, the engaging unit 340, and the transition unit 710. The way the main shaft 310, the expanding unit 320, the drill 330, and the engaging unit 340 are assembled can be referred to FIG. 3 and the descriptions thereof, which will not be repeated herein.

As shown in FIG. 7, the transition unit 710 includes a transition member 712 and a bolt 714. The transition member 712 includes a central polygonal opening 712a and limiting holes 712b, wherein the limiting holes 712b are disposed at an end surface 712c of the transition member 712 and corresponds to the protruding posts 312b on the fixing portion 312. In the present embodiment, an outer annular surface of the transition member 712 is disposed with a stair structure 712d, and a side of the outer annular surface closer to the end surface 712c of the transition member 712 has a smaller outer diameter. Accordingly, the stair structure 712d may facilitate the user to remove the transition member 712 from the fixing portion 312, but the present disclosure is not limited thereto.

The bolt 714 includes a head portion 714a and a thread portion 714b. The head portion 714a is limited in the central polygonal opening 712a and has a slot 714a1 at a top surface 714a2 of the head portion 714a, wherein the slot 714a1 sleeves the expanding unit 320 of the axle device 700. The thread portion 714b is screwed to the hole saw whose diameter is smaller than an outer diameter of the fixing portion 312.

Figure 8A:
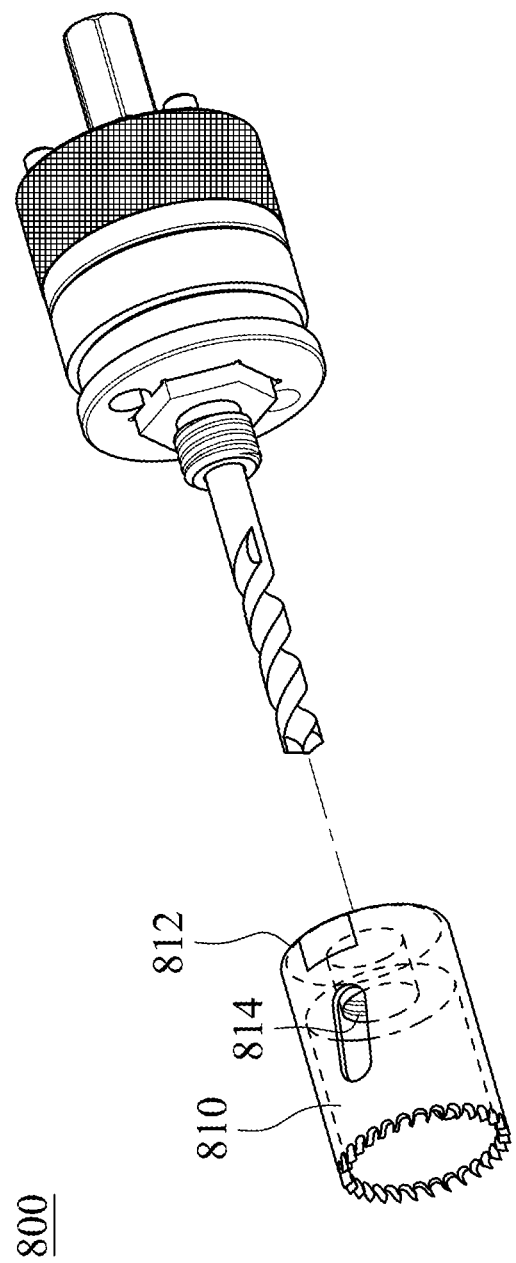
FIG. 8A is a schematic diagram of the process of assembling the axle device with a hole saw as a boring tool according to an exemplary embodiment of the present disclosure.
Figure 8B:
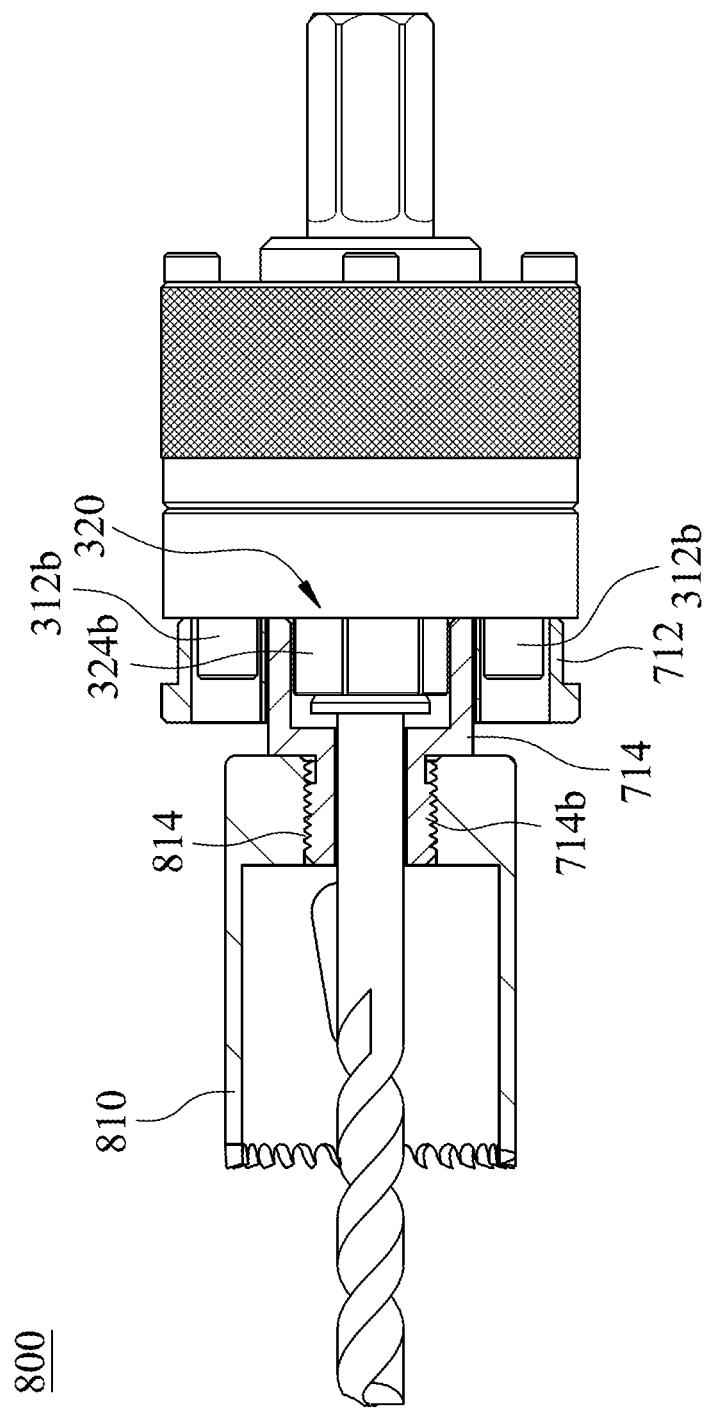
FIG. 8B is a cross-sectional view of the boring tool according to FIG. 8A.

See FIG. 8A and FIG. 8B, wherein FIG. 8A is a schematic diagram of the process of assembling the axle device 700 with a hole saw 810 as a boring tool 800 according to an exemplary embodiment of the present disclosure and FIG. 8B is a cross-sectional view of the boring tool 800 according to FIG. 8A. In the present embodiment, the hole saw 810 may be a regular hole saw whose diameter is smaller than an outer diameter of the fixing portion 312. As shown in FIG. 8A, an end surface 812 is not disposed with limiting holes like limiting holes 119 of the hole saw 11 in FIG. 6A. In this case, the axle device 700 may be assembled with the hole saw 810 by screwing the thread portion 714b to an inner thread segment 814 of the hole saw 810.

When the axle device 700 is connected with the hole saw 810 via the transition member 712 and the bolt 714, the protruding posts 312b are limited in the limiting holes 712b of the transition member 712. The expanding unit 320 is sleeved in the slot 714a1 of the head portion 714a. The axle device 700 magnetically attracts the end surface 712c of the transition member 712 with the fixing portion 312, such that the end surface 312c of the fixing portion 312 directly contacts with the end surface 712c of the transition member 712.

Since the expanding unit 320 is sleeved in the slot 714a1 of the head portion 714a, a tightness between the pawls 324b and the slot 714a1 of the head portion 714a correspondingly increases when the pawls 324b are expanded outwardly as illustrated in FIG. 8B.

From another perspective, since the hole saw 810 can be assembled with the axle device 700 via the transition unit 710 which is attracted by the magnetic force of the fixing portion 312 and sleeves the expanding unit 320 rather than via threads as the conventional way, the axle device 700 and the hole saw 810 can be easier to disengage from each other to unlock and change the hole saw 810. Specifically, the hole saw 810 can be removed from the fixing portion 312 together with the bolt 714 which is screwed to the hole saw 810.

Accordingly, the process of assembling or disassembling will be more efficient, and the cost of maintenance can be reduced since the hole saw 810 and the axle device 700 will be less probable to be broken or stripped. Besides, the appearance of the hole saw 810 does not need to be modified to be used with the axle device 700, which improves the convenience of using.

In one embodiment, the transition member 712 and the bolt 714 may be integrally formed to make the assembling more efficient. In other embodiments, transition units may have other appearances.

Figure 9:
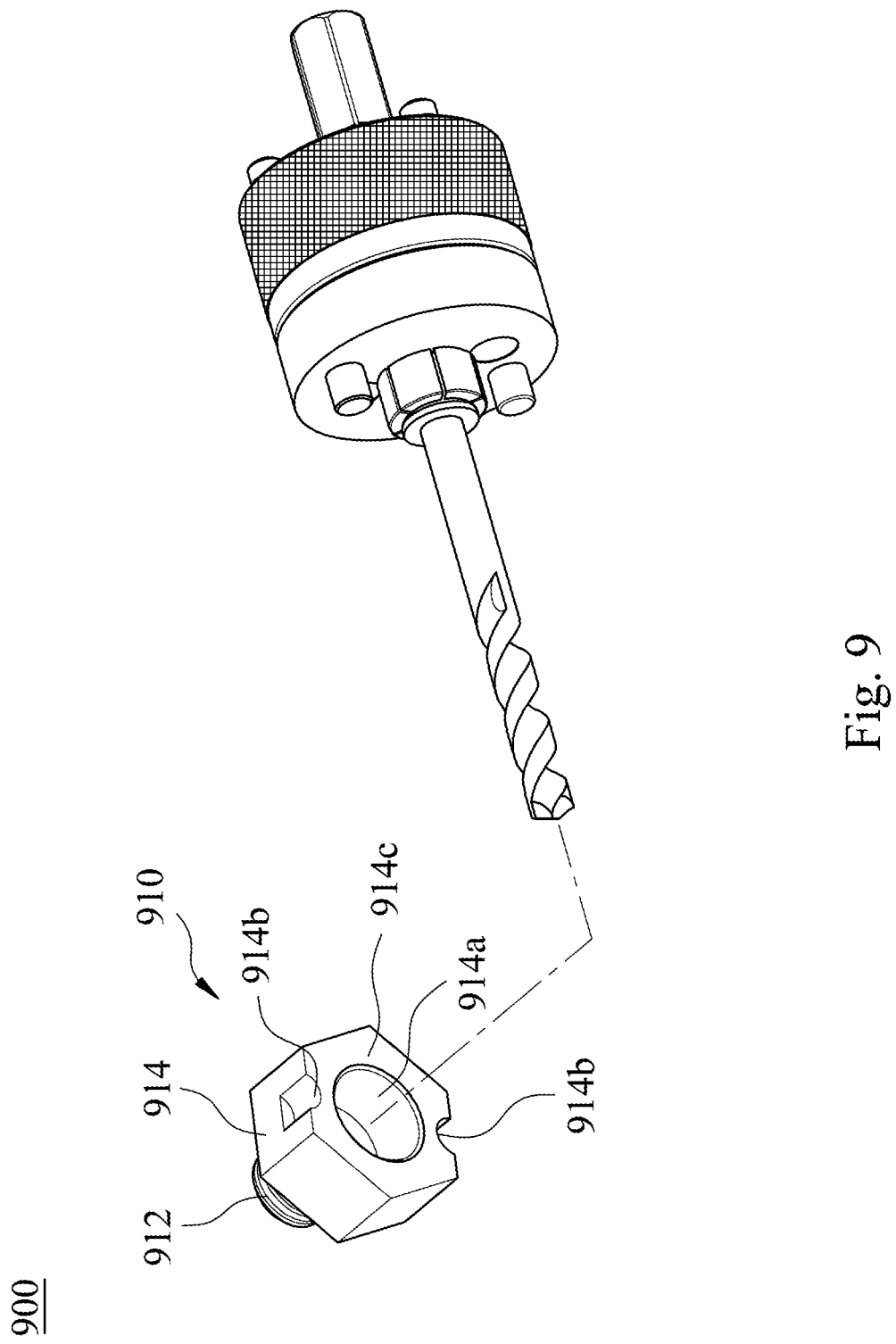
FIG. 9 is a schematic diagram of an axle device according to an exemplary embodiment of the present disclosure.

See FIG. 9, which is a schematic diagram of an axle device 900 according to an exemplary embodiment of the present disclosure. In the present embodiment, the axle device 900 includes the main shaft 310, the expanding unit 320, the drill 330, the engaging unit 340, and the transition unit 910. The way the main shaft 310, the expanding unit 320, the drill 330, and the engaging unit 340 are assembled can be referred to FIG. 3 and the descriptions thereof, which will not be repeated herein.

The transition unit 910 includes a thread portion 912 and a transition portion 914. The thread portion 912 may be screwed to the hole saw 810 illustrated in FIG. 8A and FIG. 8B as the way the thread portion 714b of bolt 714 is screwed to the hole saw 810. The transition portion 914 may be connected with the thread portion 912 and has a slot 914a and limiting slots 914b. The slot 914a is disposed at a top surface 914c of the transition portion 914 and sleeves the expanding unit 320 of the axle device 900 and the limiting slots 914b are disposed at a side of the transition portion 914 and partially corresponds to the protruding posts 312b on the fixing portion 312.

Specifically, when the transition unit 910 is assembled with the fixing portion 312, the protruding posts 312b may partially fit in the limiting slots 914b, such that the limiting slots 914b may limit the protruding posts 312b. Meanwhile, the top surface 914c may be magnetically attracted by the fixing portion 312, such that the top surface 914c directly contacts with the end surface 312c. Since the expanding unit 320 is sleeved in the slot 914a of the transition portion 914, a tightness between the pawls 324b and the slot 914a of the transition portion 914 correspondingly increases when the pawls 324b are expanded outwardly.

Figure 10:
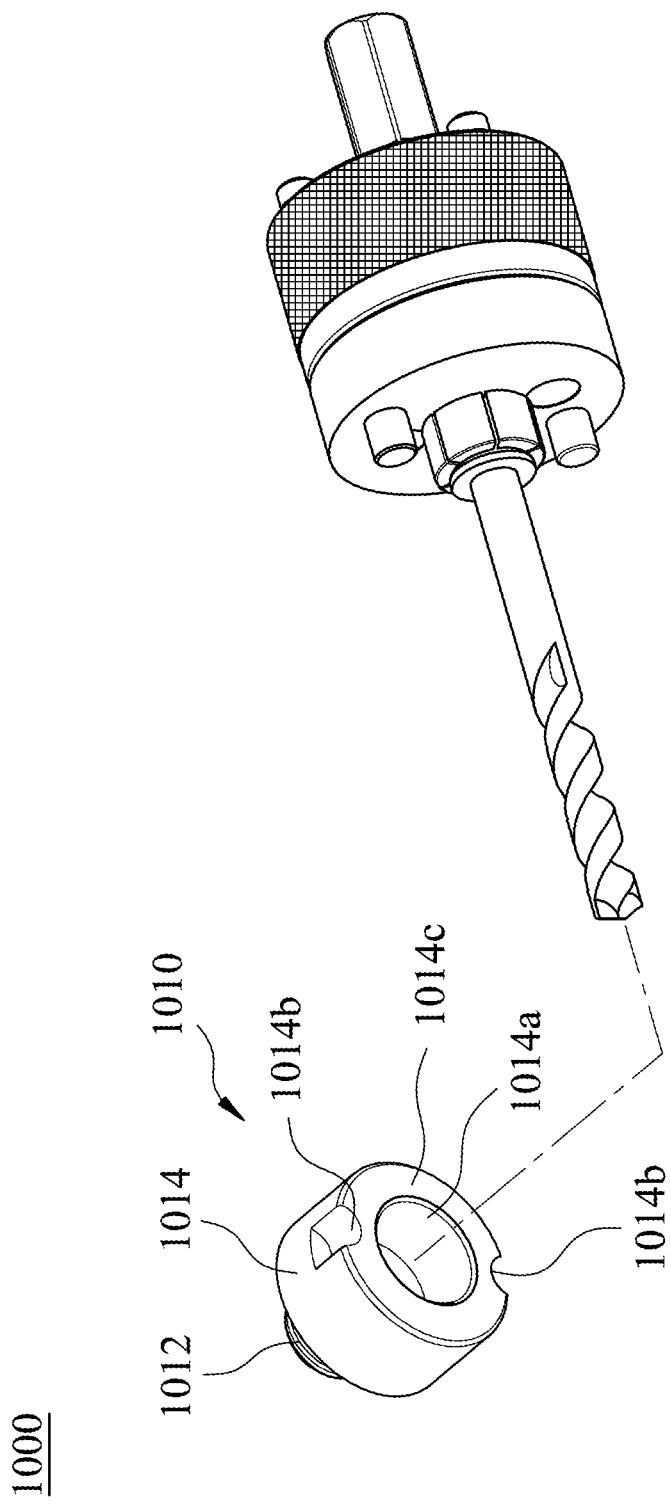
FIG. 10 is a schematic diagram of an axle device according to an exemplary embodiment of the present disclosure.

See FIG. 10, which is a schematic diagram of an axle device 1000 according to an exemplary embodiment of the present disclosure. In the present embodiment, the axle device 1000 includes the main shaft 310, the expanding unit 320, the drill 330, the engaging unit 340, and the transition unit 1010. The way the main shaft 310, the expanding unit 320, the drill 330, and the engaging unit 340 are assembled can be referred to FIG. 3 and the descriptions thereof, which will not be repeated herein.

The transition unit 1010 includes a thread portion 1012 and a transition portion 1014. The thread portion 1012 may be screwed to the hole saw 810 illustrated in FIG. 8A and FIG. 8B as the way the thread portion 714b of bolt 714 is screwed to the hole saw 810. The transition portion 1014 may be connected with the thread portion 1012 and has a slot 1014a and limiting slots 1014b. The slot 1014a is disposed at a top surface 1014c of the transition portion 1014 and sleeves the expanding unit 320 of the axle device 1000. The limiting slots 1014b are disposed at a side of the transition portion 1014 and partially correspond to the protruding posts 312b on the fixing portion 312.

In the present embodiment, the features of the transition unit 1010 is similar to the transition unit 910, except that the transition portion 1014 of the transition unit 1010 is circular, while the transition portion 914 of the transition unit 910 is hexagonal.

Figure 11:
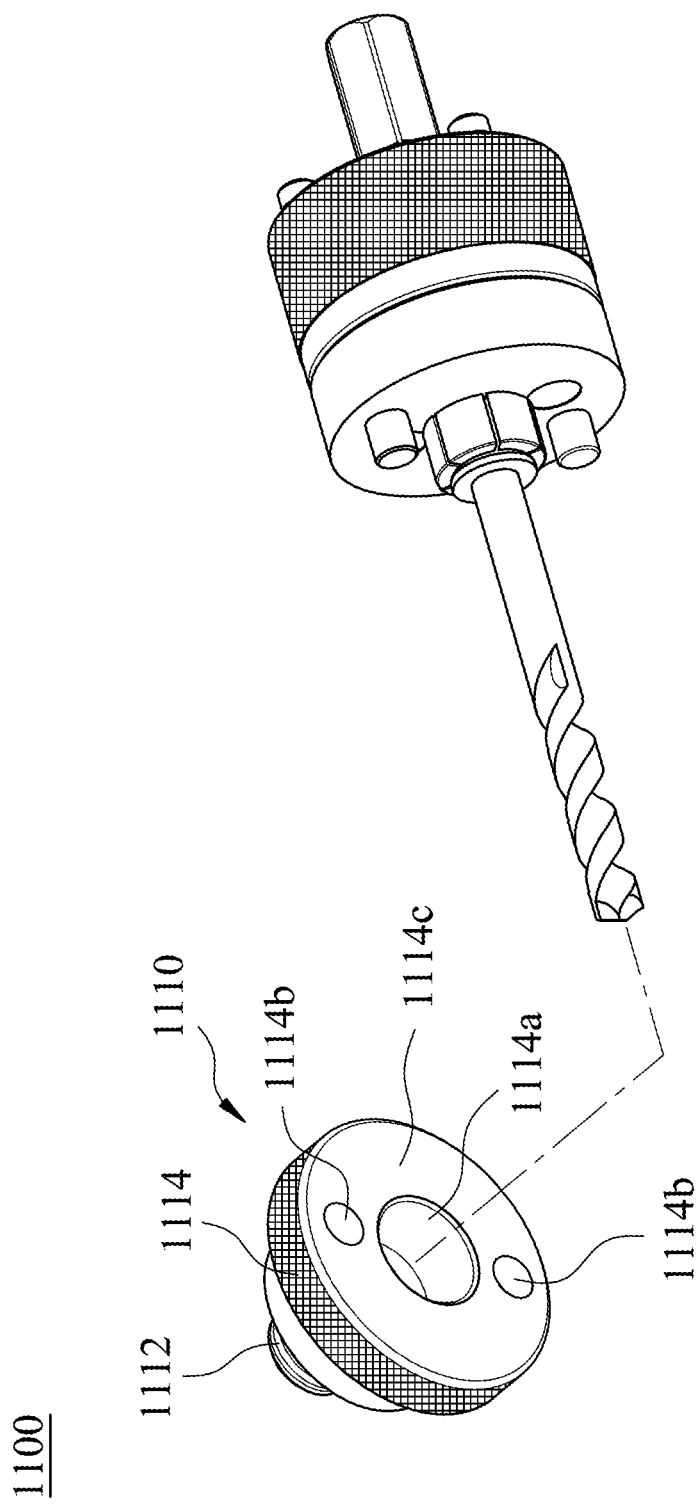
FIG. 11 is a schematic diagram of an axle device according to an exemplary embodiment of the present disclosure.

See FIG. 11, which is a schematic diagram of an axle device 1100 according to an exemplary embodiment of the present disclosure. In the present embodiment, the axle device 1100 includes the main shaft 310, the expanding unit 320, the drill 330, the engaging unit 340, and the transition unit 1110. The way the main shaft 310, the expanding unit 320, the drill 330, and the engaging unit 340 are assembled can be referred to FIG. 3 and the descriptions thereof, which will not be repeated herein.

The transition unit 1110 includes a thread portion 1112 and a transition portion 1114. The thread portion 1112 may be screwed to the hole saw 810 illustrated in FIG. 8A and FIG. 8B as the way the thread portion 714b of bolt 714 is screwed to the hole saw 810. The transition portion 1114 may be connected with the thread portion 1112 and has a slot 1114a and limiting holes 1114b. The slot 1114a and the limiting holes are disposed at a top surface 1114c of the transition portion 1114. The slot 1114a sleeves the expanding unit 320 of the axle device 1100. The limiting holes 1114b correspond to the protruding posts 312b on the fixing portion 312. A side of the transition portion 1114 may be disposed with anti-skid lines.

Similar to the aforementioned embodiments, when the transition unit 1010 is used to connect with, for example, the hole saw 810, the axle device 1000 and the hole saw 810 can be easier to disengage from each other to unlock and change the hole saw 810. Specifically, the hole saw 810 can be removed from the fixing portion 312 together with the transition unit 1010 which is screwed to the hole saw 810.

Accordingly, the process of assembling or disassembling will be more efficient, and the cost of maintenance can be reduced since the hole saw 810 and the axle device 1000 will be less probable to be broken or stripped. Besides, the appearance of the hole saw 810 does not need to be modified to be used with the axle device 1000, which improves the convenience of using.

To sum up, the present disclosure proposes an axle device and a boring tool that includes the axle device and a hole saw. When the axle device is assembled with a hole saw whose end surface is disposed with a central opening and limiting holes to form the boring tool, the axle device may magnetically attracts the end surface of the hole saw and uses the protruding posts and expanding unit to be securely and conveniently engaged with the hole saw.

On the other hand, when the axle device is assembled with a hole saw whose end surface is merely disposed with a central opening to form the boring tool, the axle device may be connected with the hole saw via the transition unit which can be screwed to the hole saw, limit the protruding posts on the axle device, and sleeve the expanding unit of the axle device. In this case, the axle device may still be securely and conveniently engaged with the hole saw.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An axle device, performing a perforating operation with a hole saw and the axle device comprising:
    a main shaft, comprising:
        a fixing portion, having a first central through hole and at least one protruding post, wherein the protruding post protrudes from an end surface of the fixing portion, and the fixing portion is magnetic;
        a driving portion, connecting a driving device for linking up with the fixing portion; and
        an external thread segment, connected between the fixing portion and the driving portion and having a central chamber and a first through hole, wherein an opening of the central chamber faces the first central through hole, the opening is smaller than the first central through hole, the first through hole is disposed at a side of the external thread segment, and an axial direction of the first through hole is perpendicular to an axial direction of the central chamber;
    an expanding unit, comprising:
        a cone blocking member, having a second central through hole and an inclined plane; and
        an expanding member, limited at a limiting slot formed by the first central through hole and the opening and comprising a second through hole and a plurality of pawls, wherein the second through hole corresponds to the second central through hole, the pawls surround the second through hole and against the inclined plane of the cone blocking member; and
    a drill, engaged in the second central through hole, and a tail portion of the drill inserts the central chamber via the second central through hole, the second through hole, and the first central through hole in order;
    an engaging unit, comprising:
        a rotating member, screwed on the external thread segment; and
        an engaging element, penetrating the first through hole, moves along with the rotating member, and engaging the tail portion of the drill with the rotating member;
    wherein when the rotating member rotates and moves toward a first direction, the engaging element correspondingly brings the drill and the cone blocking member toward the first direction, such that the inclined plane of the cone blocking member expands the pawls outwardly.

2. The axle device of claim 1, wherein an outer diameter of the hole saw is larger than a diameter of the fixing portion, and when the axle device is assembled with the hole saw, the protruding post is limited in at least one limiting hole at an end surface of the hole saw, the expanding unit is sleeved in a central opening of the end surface of the hole saw, and the axle device magnetically attracts the end surface of the hole saw with the fixing portion, such that the end surface of the hole saw directly contacts with the end surface of the fixing portion.

3. The axle device of claim 2, wherein when the pawls are expanded outwardly, a tightness between the pawls and the central opening of the hole saw correspondingly increases.

4. The axle device of claim 1, further comprising a transition unit which is used to be connected between the axle device and the hole saw whose diameter is smaller than an outer diameter of the fixing portion, wherein the transition unit is screwed to the hole saw, limits the protruding post on the fixing portion, and sleeves the expanding unit of the axle device.

5. The axle device of claim 4, wherein the transition unit comprises:
    a transition member, comprising a central polygonal opening and at least one limiting hole, wherein the limiting hole is disposed at an end surface of the transition member and corresponds to the protruding post on the fixing portion;
    a bolt, comprising:
        a head portion, limited in the central polygonal opening and having a slot at a top surface of the head portion, wherein the slot sleeves the expanding unit of the axle device; and
        a thread portion, screwed to the hole saw.

6. The axle device of claim 5, wherein when the axle device is connected with the hole saw via the transition member and the bolt, the protruding post is limited in the limiting hole of the transition member, the expanding unit is sleeved in the slot of the head portion, and the axle device magnetically attracts the end surface of the transition member with the fixing portion, such that the end surface of the fixing portion directly contacts with the end surface of the transition member.

7. The axle device of claim 6, wherein when the pawls are expanded outwardly, a tightness between the pawls and the slot of the head portion correspondingly increases.

8. The axle device of claim 5, wherein the transition member and the bolt are integrally formed.

9. The axle device of claim 5, wherein an outer annular surface of the transition member is disposed with a stair structure, and a side of the outer annular surface closer to the end surface of the transition member has a smaller outer diameter.

10. The axle device of claim 1, wherein a number of the pawls is six or eight.

11. The axle device of claim 1, wherein the expanding unit further comprises an elastic member, wherein the elastic member is disposed in the second through hole and surrounded by the pawls and against the inclined plane of the cone blocking member, and the tail portion of the drill further inserts the central chamber via the second central through hole, the elastic member the second through hole, and the first central through hole in order.

12. The axle device of claim 4, wherein the transition unit comprises:
   a thread portion, screwed to the hole saw; and
   a transition portion, connected with the thread portion and having a slot and at least one limiting slot, wherein the slot is disposed at a top surface of the transition portion and sleeves the expanding unit of the axle device and the limiting slot is disposed at a side of the transition portion and partially corresponds to the protruding post on the fixing portion.

13. The axle device of claim 12, wherein the transition portion is circular or hexagonal, and the side of the transition portion is disposed with anti-skid lines.

14. The axle device of claim 4, wherein the transition unit comprises:
   a thread portion, screwed to the hole saw; and
   a transition portion, connected with the thread portion, wherein a slot and at least one limiting hole are disposed at a top surface of the transition portion, wherein the slot sleeves the expanding unit of the axle device, the limiting hole corresponds to the protruding post on the fixing portion, and a side of the transition portion is disposed with anti-skid lines.

15. A boring tool, comprising:
   the axle device of claim 1; and
   the hole saw, assembled with the axle device, wherein an outer diameter of the hole saw is larger than a diameter of the fixing portion, and when the axle device is assembled with the hole saw, the protruding post is limited in at least one limiting hole at an end surface of the hole saw, the expanding unit is sleeved in a central opening of the end surface of the hole saw, and the axle device magnetically attracts the end surface of the hole saw with the fixing portion, such that the end surface of the hole saw directly contacts with the end surface of the fixing portion.

16. The boring tool of claim 15, wherein when the pawls are expanded outwardly, a tightness between the pawls and the central opening of the hole saw correspondingly increases.

17. A boring tool, comprising:
   the axle device of claim 4; and
   the hole saw, wherein when the axle device is connected with the hole saw via the transition unit.

18. The boring tool of claim 17, wherein when the pawls are expanded outwardly, a tightness between the pawls and the transition unit correspondingly increases.

* * * * *